United States Patent
Wang et al.

(10) Patent No.: US 8,014,433 B2
(45) Date of Patent: Sep. 6, 2011

(54) LASER APPARATUSES WITH LARGE-NUMBER MULTI-REFLECTION PUMP SYSTEMS

(75) Inventors: Zhijiang Wang, Diamond Bar, CA (US); Ying Wang, Diamond Bar, CA (US)

(73) Assignee: Apollo Instruments, Irvine, CA (US)

( * ) Notice: Subject to any disclaimer, the term of this patent is extended or adjusted under 35 U.S.C. 154(b) by 157 days.

(21) Appl. No.: 12/246,674

(22) Filed: Oct. 7, 2008

(65) Prior Publication Data
US 2009/0034575 A1 Feb. 5, 2009

Related U.S. Application Data

(63) Continuation-in-part of application No. 11/376,792, filed on Mar. 15, 2006, now abandoned.

(60) Provisional application No. 60/662,922, filed on Mar. 16, 2005.

(51) Int. Cl.
*H01S 3/091* (2006.01)
(52) U.S. Cl. ............................... 372/70; 372/93; 372/99
(58) Field of Classification Search .................. 372/70
See application file for complete search history.

(56) References Cited

U.S. PATENT DOCUMENTS

| | | | |
|---|---|---|---|
| 3,353,115 A | 11/1967 | Maiman | |
| 5,237,584 A * | 8/1993 | Shannon et al. | 372/93 |
| 5,553,088 A | 9/1996 | Brauch et al. | |
| 6,118,804 A | 9/2000 | Altmann et al. | |
| 6,778,580 B2 | 8/2004 | Erhard et al. | |
| 6,807,216 B1 | 10/2004 | Hilliard | |
| 2002/0196549 A1 | 12/2002 | Randall et al. | |
| 2003/0026315 A1 | 2/2003 | Erhard et al. | |
| 2003/0058915 A1 | 3/2003 | Kumkar | |
| 2005/0152415 A1* | 7/2005 | Giesen et al. | 372/34 |

OTHER PUBLICATIONS

C. Stewen, K. Contag, M. Larionov, A Giesen, and H. Hugel, *A 1-kW CW Thin Disc Laser*, IEEE J. Selected Topics in Quant. Elect. vol. 6, p. 650-657; (2000).

* cited by examiner

*Primary Examiner* — Jessica T Stultz
*Assistant Examiner* — Xinning Niu
(74) *Attorney, Agent, or Firm* — Kilpatrick Townsend & Stockton LLP

(57) ABSTRACT

A large number of passes of pump light through an active mirror in a solid state disk laser is realized using a pair of coupled imaging systems, where the optical axes of imaging systems are not coincident. Two imaging systems are optically coupled, so that an image of the first imaging system is an object of the second imaging system, and vice versa. An active mirror is disposed at the object or image plane, or at the focal plane of any one of the coupled imaging systems, where the position of the reflected pump beam during the multi-reflection between the first and second imaging systems is substantially unchanged.

10 Claims, 16 Drawing Sheets

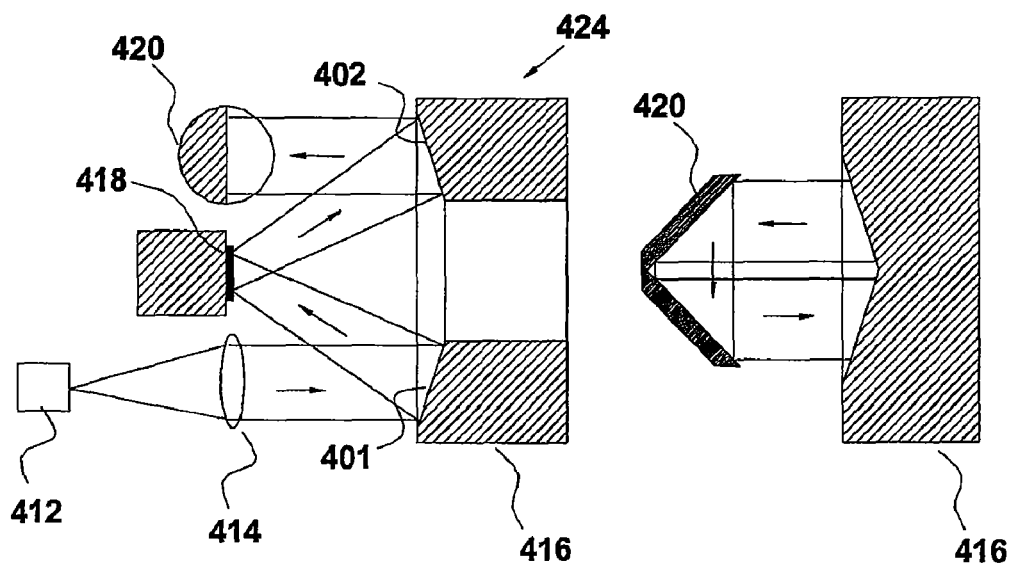
Fig. 4(a)
(Prior Art)
Fig. 4(c)
(Prior Art)
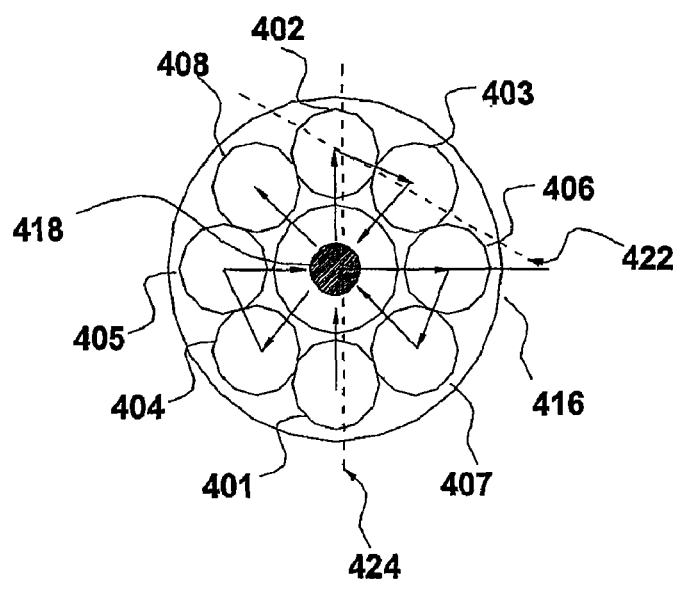
Fig. 4(b)
(Prior Art)

LASER APPARATUSES WITH LARGE-NUMBER MULTI-REFLECTION PUMP SYSTEMS

CROSS-REFERENCES TO RELATED APPLICATIONS

This application is a continuation in part of application Ser. No. 11/376,792 filed Mar. 15, 2006, which is a continuation of provisional application No. 60/662,922 filed Mar. 16, 2005, now abandoned, the disclosures of which are incorporated herein by reference.

FIELD OF THE INVENTION

The present invention relates to a pump system for a solid state laser, or more specifically, to a pump system that provides a large number of passes of the pump light through an active mirror with simple optical means.

BACKGROUND OF THE INVENTION

Currently, various lasers have been available for various applications, ranging from low power semiconductor lasers for opto-electronic devices to high power solid state lasers for manufacturing, which is kin to the first laser invented by Maiman in 1967 (U.S. Pat. No. 3,353,115). In contrast to other light sources that emit incoherent light, a laser emits a coherent light beam. Theoretically, a coherent light beam can be focused in an area having a diameter of substantially the same order as the wavelength of light to produce high density of energy. The high quality of coherent light beam is typically expressed in a propagation factor $M^2=1$.

For example, a solid state laser 100 is shown in FIG. 1, which typically comprises a solid state crystal rod 102 surrounded by a helical flashlamp 104. Light emitted by the flashlamp 104, known as pump light, is absorbed by the crystal 102 to excite the electrons in the crystal to an upper energy level. The excited electrons then return to the original energy level through an intermediate level resulting in light emission with a specific wavelength characterizing the crystal. The crystal rod 102 and the flashlamp 104 are configured in an optical cavity formed by a mirror 106 and a partial mirror 108. The resonance of the cavity and the stimulated emission in the crystal result in the emission of a coherent laser light beam 110 through the partial mirror 108.

The main merit of a solid state laser is its high power beam. The crystal rod absorbs pump light supplied by the flashlamp to its side and transforms it into a high power laser beam emitted from its face. A longer crystal rod will absorb more pump energy and thus emit a higher power laser beam.

However, since the laser beam travels through the crystal rod many times, the quality of light beam, e.g., the regularity of its wavefront, will be degraded by the inhomogeneity of the rod including the uneven thermal distribution in the rod. The quality of a laser beam is reflected in its focusability. For a perfect laser beam, the beam propagation factor $M^2$ is 1. For example, the beam propagation factor $M^2$ of a multi kilo-Watt solid state rod laser may be larger than 150, meaning the focusability of the beam is 150 times worse than the theoretical limit ($M^2=1$).

A logical solution to less degradation of beam quality (i.e., smaller $M^2$) would be shortening the crystal rod, which shortens the light path inside the rod. When the rod is getting shorter, it eventually becomes a disk. A further logical solution would be illuminating the face of the disk with the pump light instead of illuminating the side of the disk, since the face has much larger area than the side of the disk to receive the pump light.

For example, a solid state disk laser was disclosed in U.S. Pat. No. 5,553,088 (1996) to Brauch et al. The disclosed solid state disk laser 200 is shown in FIG. 2, which comprises a crystal disk 202 mounted on a heat sink 204 where a reflective layer 206 is disposed between the disk 202 and the heat sink 204. A face 208 of the disk 202 opposite to the heat sink 204 is AR (anti reflection) coated. The disk assembly including a disk 202, a heat sink 204, a reflective layer 206, and an AR coating 208 is referred to as an active mirror.

A diverging pump light 210 exiting from a light delivery device 212 such as a fiber bundle is focused on the disk 202 by a lens 214. The pump light can be provided by a laser diode or a set of laser diodes (not shown). The pump light 210 is incident obliquely on the disk 202. The pump light passes through the AR coated face 208 and the disk 202, and is reflected by the reflective layer 206 to pass the disk for the second time. The reflected pump light 210 is focused by a lens 216 on a mirror 218. The pump light is then reflected by the mirror 218 and passes the disk 202. After the pump light is reflected by the layer 206, it passes the disk 202 again, and returns to the light delivery device 212.

An optical cavity is formed by a mirror 220, a partial mirror 222, and the reflective layer 206 on the back of the disk 202 to generate a laser beam 224 oblique to the disk 202. In this way, the disk 202 is in the cavity and multiple passes of the laser beam 224 through the disk 202 are realized. The laser beam 224 exits from the partial mirror 222.

In this example, 4 passes of the pump light through the disk are demonstrated. A similar pump system that provides 4 passes of the pump light through an active mirror is also taught in US Patent Application Publication No. 2005/0152415 to Giesen et al. Although more passes of pump light through the disk are required to produce a higher power laser beam, all disclosed methods can only provide limited numbers of passes of pump light through the disk.

Another method disclosed in the same U.S. Pat. No. 5,553,088 (1996) uses four spherical mirrors and one plane mirror disposed next to the crystal disk to provide 8 passes of the pump light through the disk. For example, a pump system for generating multi-pass pump light 300 is shown in FIG. 3, which comprises four individual spherical mirrors 302, 304, 306, and 308. A diverging pump light 310 exiting from a light delivery device 312 is focused by mirror 302 on a disk assembly, which is an active mirror 314. The active mirror 314 comprises a plane crystal disk, a heat sink, a reflective layer between the disk and the heat sink, and an AR coated face of the disk opposite to the heat sink. The pump light is reflected by the active mirror 314 to mirror 306. Mirror 306 focuses the light on a plane mirror 316 disposed next to the active mirror 314. Plane mirror 316 reflects the light to mirror 308. Mirror 308 reflects the light to the active mirror 314. The active mirror 314 reflects the light to mirror 304. Mirror 304 reflects the light back to the active mirror 314, and reverses the whole light path.

The light path is as follows. Light delivery device 312→(1) spherical mirror 302→(2) active mirror 314→(3) spherical mirror 306→(4) plane mirror 316→(5) spherical mirror 308→(6) active mirror 314→(7) spherical mirror 304→(8) active mirror 314→(9) spherical mirror 308→(10) plane mirror 316→(11) spherical mirror 306→(12) active mirror 314→(13) spherical mirror 302→(14) light delivery device 312. The pump light hits the active mirror 4 times at steps (2), (6), (8), and (12). Since each hit produces two passes, 8 passes of the pump light through the active mirror are realized.

The disadvantages of this method are: (1) the number of passes of the pump light through the active mirror is limited by the number of the individual spherical mirrors (e.g., 4 individual spherical mirrors provide 8 passes), (2) the number of the individual spherical mirrors is limited by the size of the mirror, and (3) the mechanical system for supporting a plurality of individual spherical mirrors is complex and costly.

Another approach was disclosed by Stewen et al. (C. Stewen, K. Contag, M. Larionov, A. Giesen, and H. Hugel, A 1-kW cw thin disc laser, IEEE J. Selected Topics in Quant. Elect. Vol. 6, 650-657, 2000) as shown in FIG. 4(a). A diverging pump light exiting from a light delivery device 412 such as a fiber bundle is collimated by a lens 414. The collimated pump light is incident on a segment 401 of a parabolic mirror 416, which has a central hole for allowing a laser beam (not shown) generated from an active mirror 418 to get through the mirror 416.

The pump light is focused by the parabolic mirror to the active mirror 418. The active mirror 418 reflects the light to a segment 402 of the mirror 416. The mirror collimates and reflects the light to a folding mirror 420. The folding mirror translates and reflects the collimated beam to a segment 403 of the mirror 416.

Further referring to FIG. 4(b), at segment 403, the mirror reflects the light to the active mirror 418. The active mirror reflects it to a segment 404. The mirror reflects it to a second folding mirror (not shown). The second folding mirror translates and reflects it to a segment 405. The mirror reflects it to the active mirror 418. The active mirror reflects it to a segment 406. The mirror reflects it to a third folding mirror (not shown). The third folding mirror translates and reflects it to a segment 407. The mirror reflects it to the active mirror 418. The active mirror 418 reflects it to a segment 408. The mirror reflects it to a plane mirror (not shown). The plane mirror reflects it to segment 408, and the pump light reverses its light path, until it is reflected by the mirror at segment 401 toward the device 412. In this way, the pump light hits the active mirror 418 for 8 times. Since each hit produces two passes, 16 passes of the pump light through the active mirror are realized. Cross-section 422 in FIG. 4(b) is shown in FIG. 4(c). FIG. 4(a) corresponds to cross-section 424 in FIG. 4(b).

Similarly, the disadvantages of this method are: (1) the number of passes of the pump light through the active mirror is limited by the number of the folding mirrors (e.g., 3 folding mirrors provide 16 passes), (2) the number of the folding mirrors is limited by the size of the parabolic mirror and the folding mirror, and (3) the mechanical system for supporting a plurality of folding mirrors is complex and costly.

Similar methods using a lens or a mirror together with a number of discrete prisms to direct the pump beam back to an active mirror were disclosed in U.S. Pat. No. 6,778,580 (2004) to Erhard and Giesen. Accordingly, the disadvantages of these methods include: (1) the number of passes of the pump light through the active mirror is limited by the number of prisms, (2) the number of prisms is limited by the size of the prism, and (3) the mechanical system for supporting a plurality of prisms is complex and costly.

Therefore, the main disadvantage of prior-art pump systems is that only a limited number of passes of the pump light through the active mirror can be achieved with great difficulty. For example:

a system using an active mirror and a mirror (total 2 components) can provide 4 passes of the pump light through the active mirror;

a system using an active mirror, a plane mirror, and 4 spherical mirrors (total 6 components) can provide 8 passes of the pump light through the active mirror;

a system using an active mirror, a parabolic mirror, 3 folding mirrors, and a plane mirror (total 6 components) can provide 16 passes of the pump light through the active mirror.

Accordingly, better methods for providing larger number of passes of the pump light through the active mirror with simplest possible optical means are desired.

BRIEF SUMMARY OF THE INVENTION

Therefore, the present invention has been made in view of the above-mentioned disadvantages, and it is an object of the present invention to provide methods and apparatuses for allowing a large number of passes of the pump light through the active mirror with simplest possible optical means.

According to one aspect of the present invention, a large number of passes of the pump light through the active mirror can be realized using a pair of coupled imaging systems, where the optical axes of imaging systems are not coincident. Two imaging systems are optically coupled, so that a point A', which is a focused pump beam, is imaged at a point B' by the first imaging system, and point B' is imaged back at point A' by the second imaging system. The optical axes of two imaging systems are not coincident, so that the reflected pump beam changes its direction during the multi-reflection between the first and second imaging systems, although points A' and B' are substantially unchanged. At least one of the two points A' and B' is in an active mirror.

According to another aspect of the present invention, a large number of passes of the pump light through the active mirror can be realized using a pair of coupled imaging systems, where the optical axes of imaging systems are not coincident. Two imaging systems are optically coupled, so that a point 1, which is a focused pump beam, is imaged to a point 2 by the first imaging system, point 2 is imaged to a point 3 by the second imaging system, point 3 is imaged to a point 4 by the first imaging system, and so on. The optical axes of two systems are not coincident, so that points 1 and 3 are not coincident. Similarly, points 2 and 4 are not coincident, and so on. The focused pump beam is collimated by a lens, and the collimated pump beam is reflected by an active mirror disposed at a focal plane of the lens. The position of the reflected collimated beam at the active mirror is substantially unchanged during the multi-reflection between the first and second imaging systems.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4(a) shows a prior-art solid state disk laser that provides 16 passes of the pump light through an active mirror;

FIG. 4(b) shows positions of the pump beam on the parabolic mirror of FIG. 4(a);

FIG. 4(c) shows a cross-section view of FIG. 4(b) showing a folding mirror that translates a collimated beam;

FIG. 1 shows positions of the pump beam on the large spherical mirror of FIG. 5 during multi-reflection;

DETAILED DESCRIPTION OF THE INVENTION

Multi-Reflection System Using Three Spherical Mirrors

Figure 1:
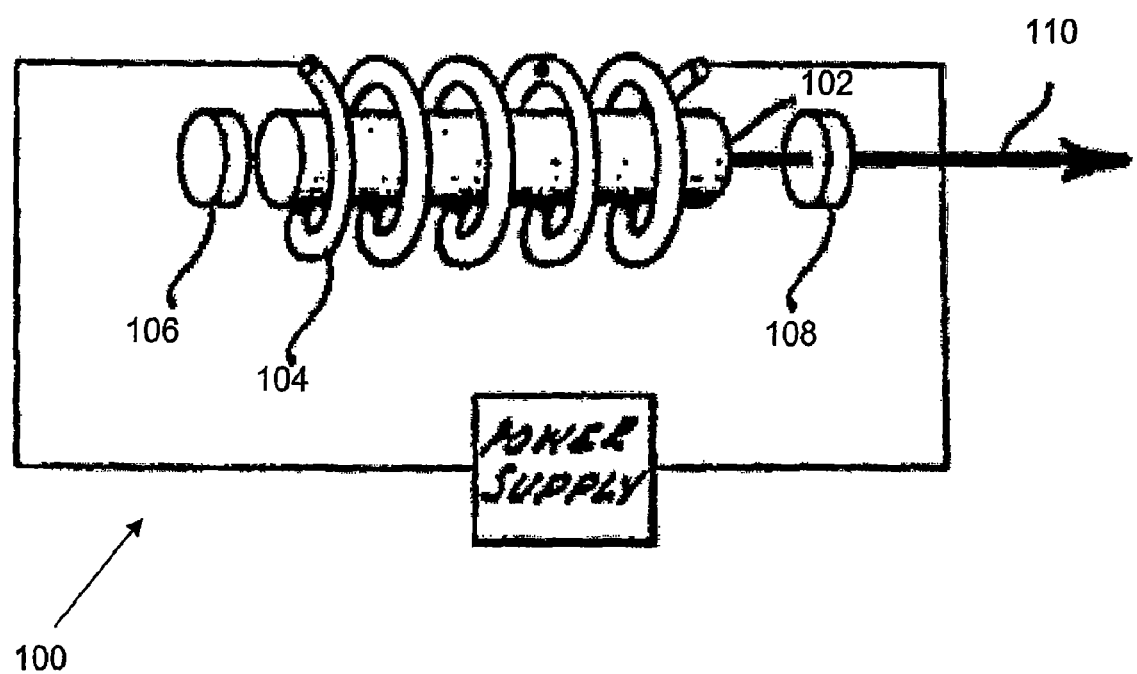
FIG. 1 shows the first solid state laser.
Figure 2:
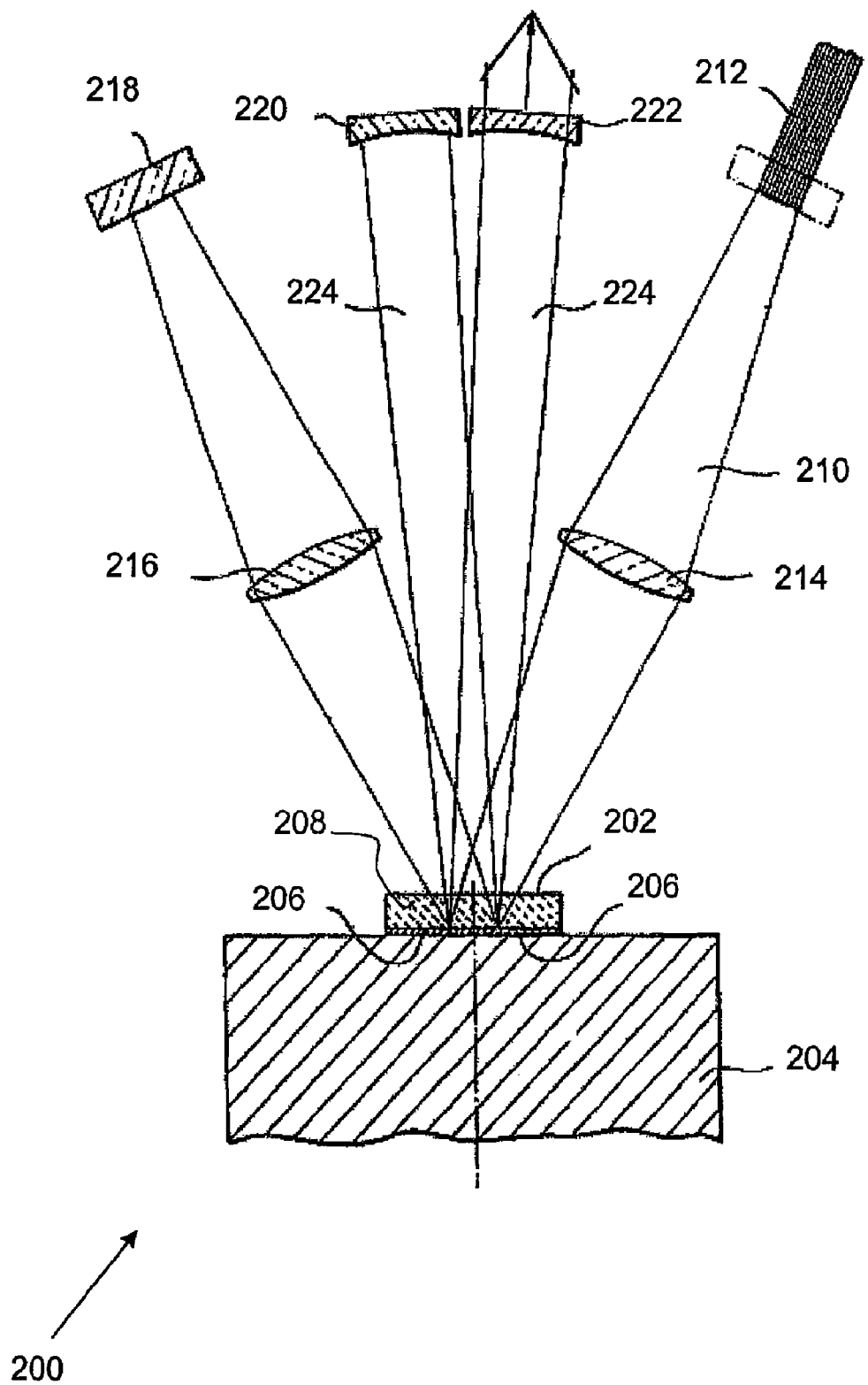
FIG. 2 shows a prior-art solid state disk laser that provides 4 passes of the pump light through an active mirror.
Figure 3:
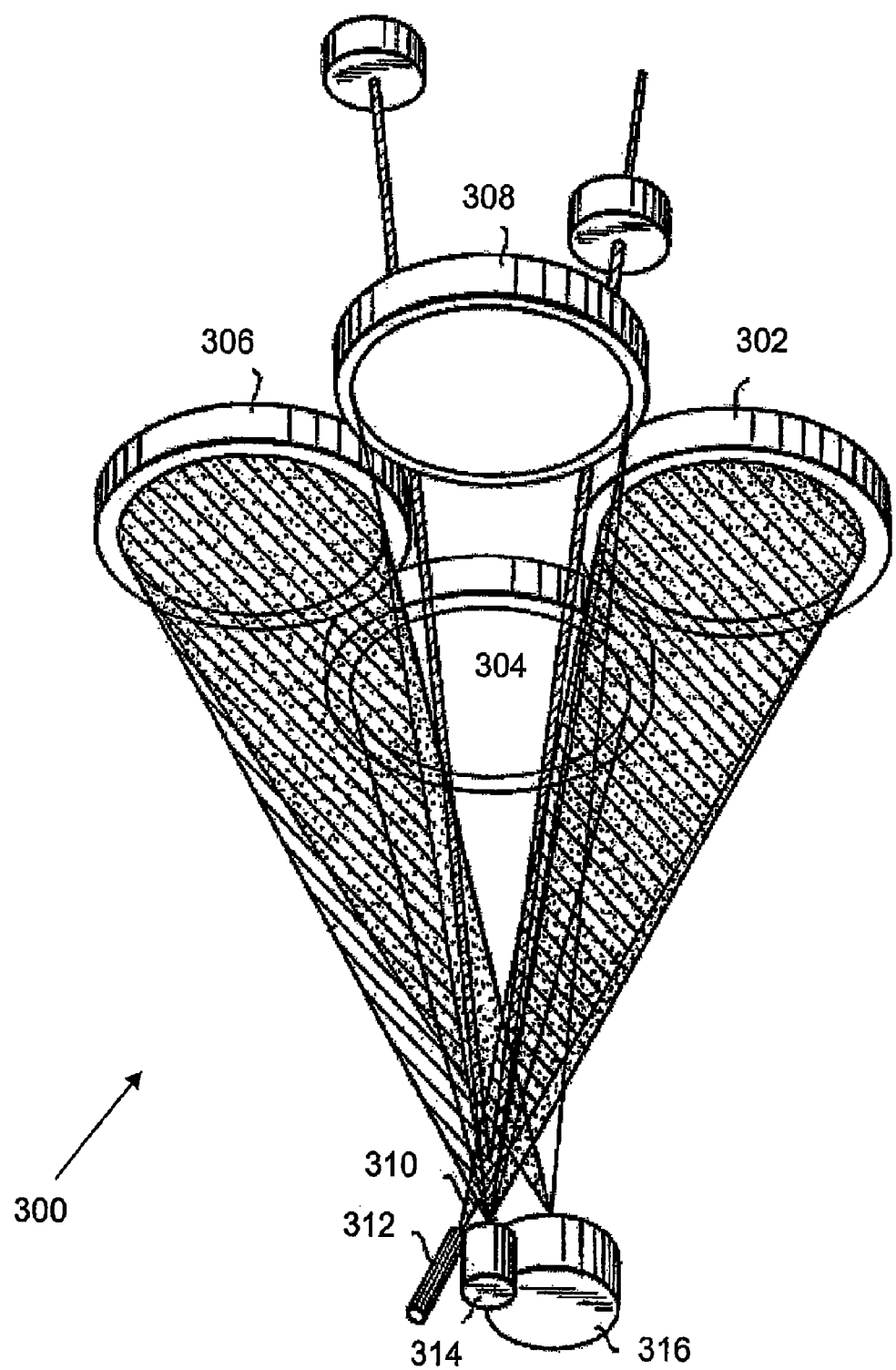
FIG. 3 shows a prior-art solid state disk laser that provides 8 passes of the pump light through an active mirror.
Figure 5:
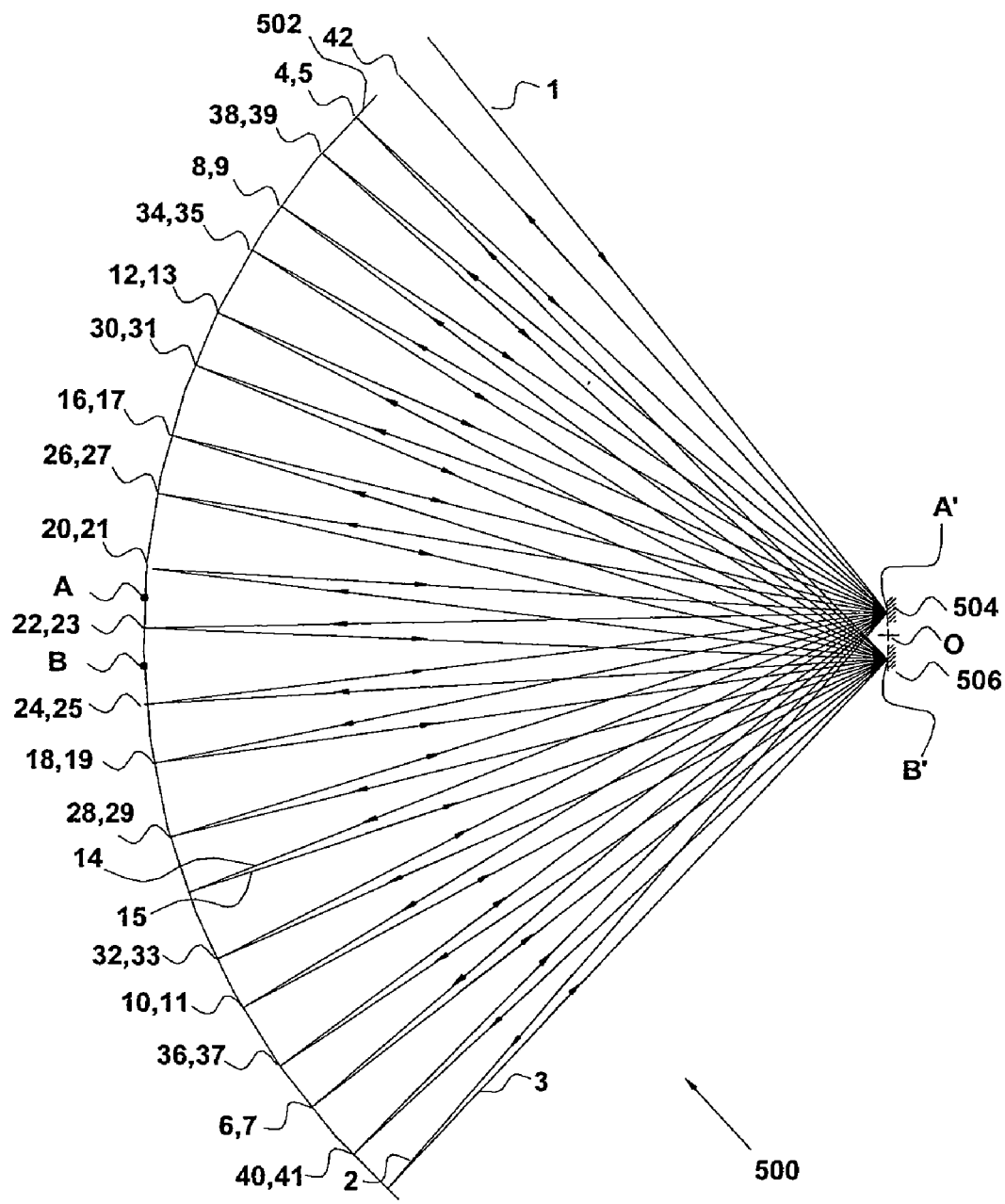
FIG. 5 shows an embodiment of a multi-reflection pump system including a large spherical mirror and two small spherical mirrors.

FIG. 5 shows one embodiment of pump system in which a large number of passes of the pump light through the active mirror can be realized. The pump system 500 comprises a large concave spherical mirror 502 and two small concave spherical mirrors 504 and 506. In an implementation, one of the small mirrors can be a simple mirror (not an active mirror) and the other one of the small mirrors can be an active mirror. In another implementation, both small mirrors can be active mirrors.

For example, all mirrors have the same radii R. The center of curvature of the large spherical mirror 502 is located at point O, which is the central point between small spherical mirrors 504 and 506. The centers of curvature of spherical mirrors 504 and 506 are located at points A and B, respectively, on the large spherical mirror 502. The arc between A and B is d degree. All points A, B and O are in a meridional plane. In other words, the plane of paper of FIG. 5 is a meridional plane. The meridional plane crosses the mirror 502 at a meridional line.

A beam 1 entering the pump system 500 strikes mirror 504 at point A'. Beam 1 is reflected by mirror 504 into a beam 2 toward mirror 502. Beam 2 is further reflected by mirror 502 into a beam 3 toward mirror 506. Beam 3 strikes mirror 506 at point B'. Beam 3 is then reflected into a beam 4 toward mirror 502. Beam 4 is then reflected by mirror 502 into a beam 5, which strikes mirror 504 substantially at A'. In other words, the pump light beam strikes substantially the same location at mirror 504. At this step, one reflection cycle is completed. Beam 5 has shifted from beam 1 by an arc about 2d degree on mirror 502, where d is the arc between points A and B on mirror 502.

The next reflection cycle begins when beam 5 is further reflected by mirror 504 into a beam 6, and ends when a beam 9 strikes mirror 504 substantially at A'. At the end of each reflection cycle, the position of the reflected beam on mirror 502 shifts by an arc of 2d on mirror 502. The position of the end-of-cycle beam (e.g., beams 1, 5, 9, 13, ..., 41) shifts from a first edge of mirror 502 where beam 1 enters the system to the central portion of mirror 502 and further to the other edge of the mirror. Eventually a reflected beam 42 is out of the mirror, for example from the first edge of the mirror, and leaves the pump system 500.

The number of reflections depends on the ratio of the arc of mirror 502 to d (arc between A and B). On the other hand, d is determined by the numerical aperture (NA) of the incoming pump beam, which will be described later.

Figure 6:
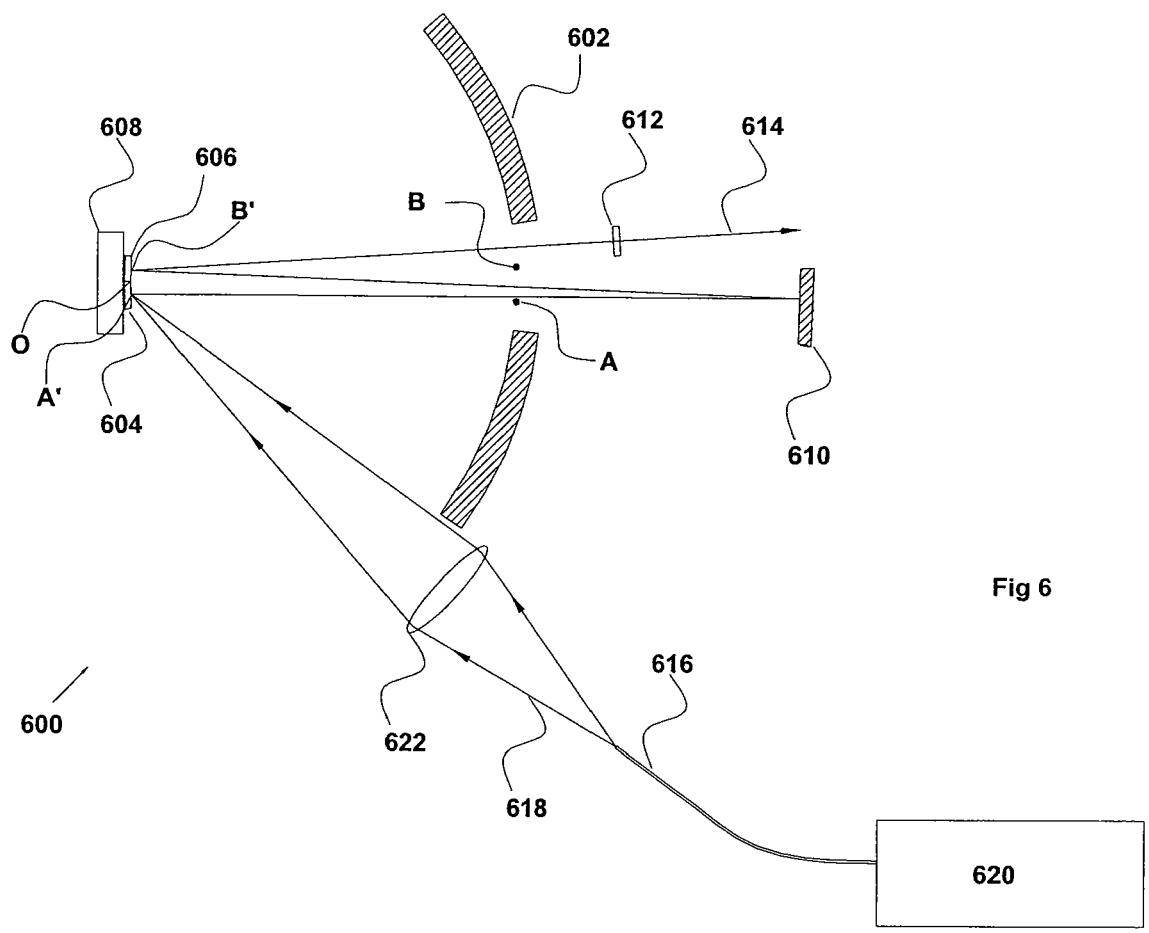
FIG. 6 shows an embodiment of a laser system using the pump system of FIG. 5.

FIG. 6 shows an example of laser system 600 using a pump system of FIG. 5, where a laser beam 614 is in the meridional plane of the system 600. The pump system comprises a large concave spherical mirror 602 and two small concave spherical active mirrors 604 and 606. An active mirror typically comprises a laser crystal disk mounted on a heat sink, a high-reflection layer between the laser crystal disk and the heat sink, and an AR coated front surface. The high-reflective coated surface is mounted on a common heat sink 608. It is also possible to use two separate heat sinks instead of a common heat sink.

The center of curvature of the large spherical mirror 602 is located at point O, which is the central point between spherical active mirrors 604 and 606. The centers of curvature of spherical active mirrors 604 and 606 are located at points A and B, respectively, on the sphere of the mirror 602. A hole is made at the central region of mirror 602 to allow a laser beam 614 to pass through the hole. The laser system 600 also comprises a high-reflection mirror 610 and a partial-reflection mirror 612, which together with active mirrors 604 and 606 form a laser cavity through the hole of mirror 602. A laser beam 614 is generated in the meridional plane (the plane of A, B, and O), which is the plane of paper of FIG. 6. The laser beam 614 is emitted through the partial-reflection mirror 612.

Multiple modules comprising a spherical mirror and two active mirrors mentioned above can be put in series in a laser cavity to form a laser of much higher output power.

A light delivering device 616, for example a fiber or fiber bundle, emits diverging pump light 618 originated from a laser diode or other pump light source 620. The pump light 618 is focused by a lens 622 at A' on active mirror 604. The incoming pump beam to A' is a light cone with its tip at A' and its base on lens 622. The light cone is represented with beam 1 in FIG. 5.

Referring to FIG. 5, beam 1 is an incoming pump light that is focused at point A'. Beam 1 is associated with a light cone where its tip is at A', and its base is on the sphere of mirror 502. A' is then imaged at B' by mirrors 504 and 502, B' is imaged back at A' by mirrors 506 and 502, A' is again imaged at B' by mirrors 504 and 502, B' is imaged back at A' by mirrors 506 and 502, . . . , and so on. Although the positions of images A' and B' are substantially unchanged, the reflected beam strikes mirror 502 at a different location for each reflection. In other words, the tips of light cones associated with beams 1, 2, and 5 are at A' but their bases on the sphere of mirror 502 are moved. Similarly, the tips of light cones associated with beams 3 and 4 are at B' but their bases on mirror 502 are moved. Eventually the base of the light cone is out of the mirror and thus the reflected beam leaves the mirror. For example, the beam leaves mirror 502 at a location near the location where the pump beam enters the multi-reflection system.

For example, if the arc AB is 5°, the arc between beam 1 and beam 5 on mirror 502 is 10°. Beam 1 is a light cone. The tip of the light cone is at A' and the base of the light cone is on mirror 502. For example, the diameter of the base of the light cone equals to the arc between beam 1 and beam 5 on mirror 502 or 10°. To allow the incident pump light, e.g., beam 1, to fully strike mirror 504, the light cone must not be blocked by mirror 502 (see FIG. 6). If mirror 502 is a 100° arc, the mirror 502 covers 10 10° arcs, and the reflected light can strike mirrors 504 and 506 for 11 and 10 times, respectively. When beam 1 is in the meridional plane, all reflected beams are also in the meridional plane as shown in FIG. 5.

Figure 7:
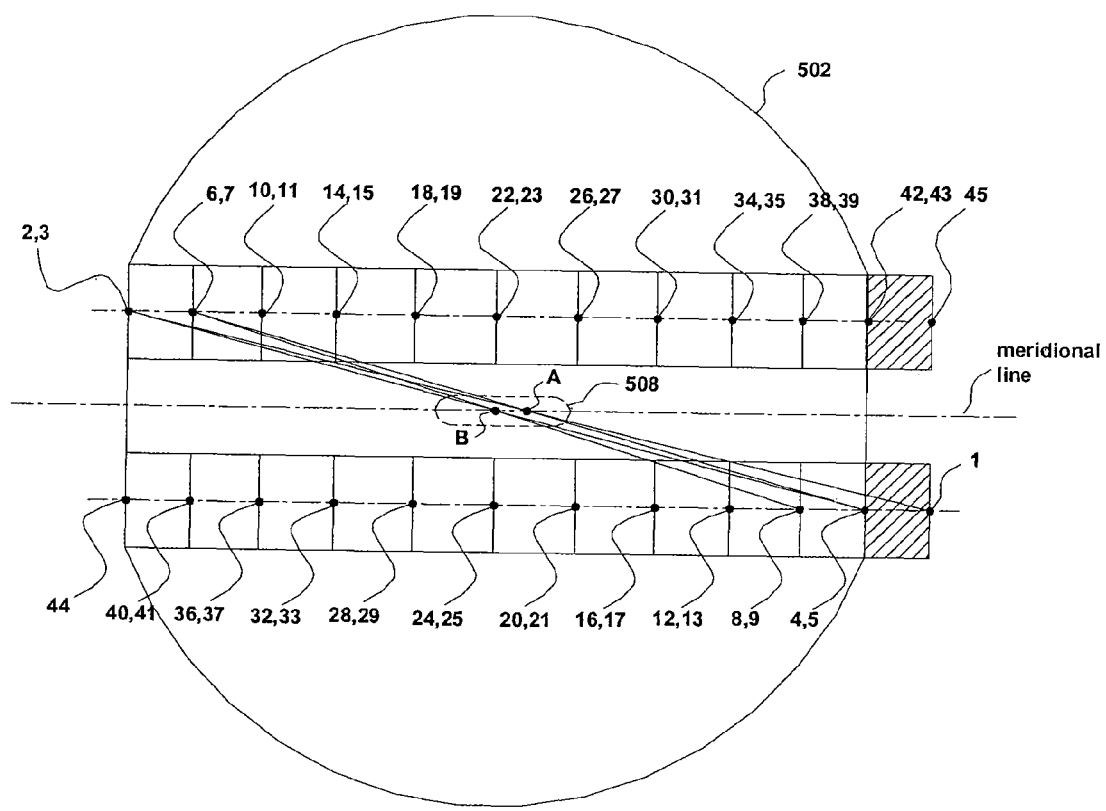
FIG. 7 shows an embodiment of a position of the pump beam on the large spherical mirror of FIG. 5 during multi-reflection.

While FIG. 5 shows a side view of mirror 502, FIG. 7 shows a front view of mirror 502. FIG. 7 shows a configuration that beam 1 is not in the meridional plane, but it still strikes at A' of small mirror 504 (not shown in FIG. 7). Accordingly, all positions of reflected beams on mirror 502, i.e., bases of light cones on mirror 502, are on two lines symmetrical with respect to the meridional line. The distance between each two neighboring points (e.g., beams 1 and 5) is about 2d.

Similar to FIG. 5, the beams gradually shift to the central portion of mirror 502 and then to the edge. At least an edge of mirror 502 is trimmed for beam input and output. The shadowed squares indicate the incident and exit positions of beams. Each of the squares shows the reflected beams on mirror 502, e.g., the base of light cone, during the multi-reflection process. The base of the light cone can be any shape, for example, circular, elliptical, square, . . . , which is shaped by an aperture. For example, a square-shaped base is shown.

At the shadowed area for the exit beam, an additional small spherical mirror with its center of curvature located at A' of mirror 504 can be used to reflect the exit beam (beam 45) back to mirror 504 and reverse the light along the original path all the way back to the entrance position (beam 1). Therefore, when the incident beam (beam 1) is not in the meridional plane, the number of reflections can be doubled by adding a mirror to reverse the light path. In the configuration shown in FIG. 7, beams 1, 5, 9, 13, 17, 21, 25, 29, 33, 37, 41, 45, 41, 37, 33, 29, 25, 21, 17, 13, 9, 5, hit A' on mirror 504 for a total of 22 times. Thus, the pump beam can hit mirror 504 for 22 times and mirror 506 for 21 times. Since each hit produces two passes, 44 and 42 passes of the pump light through respective active mirrors are realized. Furthermore, since both active mirrors are used to generate a laser beam, the configuration shown in FIG. 7 is effectively equivalent to 86 passes of the pump beam through an active mirror.

Accordingly, a system using a spherical mirror, two spherical active mirrors, and an extra spherical mirror (total 4 components) can provide 44 and 42 passes of the pump light through respective active mirrors, which is effectively equivalent to 86 passes of the pump beam through an active mirror.

Since there are no reflected beams in the central region of mirror 502, a hole 508 can be made in the central region of mirror 502. Hole 508 is needed to allow a laser beam passing through mirror 502 (see FIG. 6).

Figure 8:
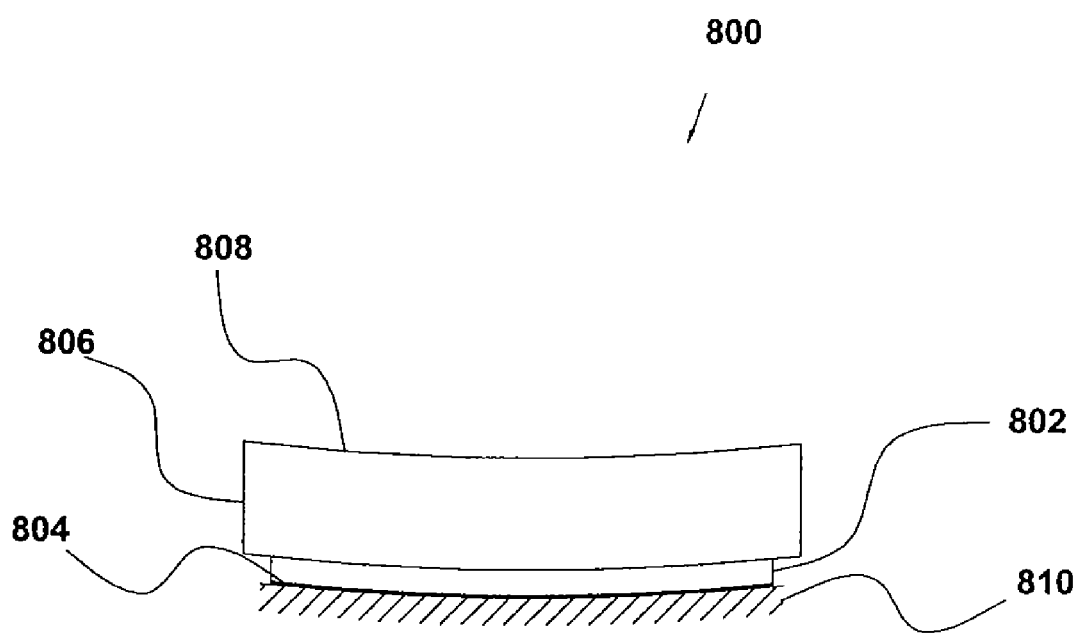
FIG. 8 shows an embodiment of a spherical active mirror of FIG. 5.

FIG. 8 shows an example of spherical active mirror 800 comprising a thin disk 802 made of a crystal or ceramic, such as Yb:YAG, Nd:YAG, Nd:YVO4 or other materials doped with active species. The front and back surfaces of the disc are both spherical, with the back face coated with a high-reflection layer 804. The disk 802 with the high-reflection layer 804 is mounted on a heat sink 810. The disc 802 can also have aspheric surfaces.

The front surface of the disk 802 is covered by a cap 806. The cap 806 is made of a transparent material with high heat conductivity, which can be selected from sapphire, YAG, or diamond. It is preferred that the cap 806 contacts with a heat sink (not shown) for heat removal. One possibility is to make the cap 806 larger than the disk 802 so the cap 806 can be in contact with a heat sink (not shown). For example, the cap 806 can be bonded with the disk 802 such as by sintering. The front surface of the cap 806 is coated with an AR coating 808. An active mirror can also be made of a plane thin disk or thin film doped with active species. However, a curved active mirror reduces more ASE (amplified spontaneous emission) noise as compared with a plane active mirror.

In an implementation disclosed above, a laser beam is in the meridional plane. Accordingly, a hole in the central region of mirror 502 or 602 on the meridional line is needed to allow the laser beam passing through the mirror. In this implementation, the pump beam must not be in the central region of the mirror, and must not be on the meridional line. In some implementations, the laser beam may not be in the meridional plane. Furthermore, the laser beam may not pass through the central region of the mirror. Accordingly, the pump beam can be on the meridional line.

Figure 9:
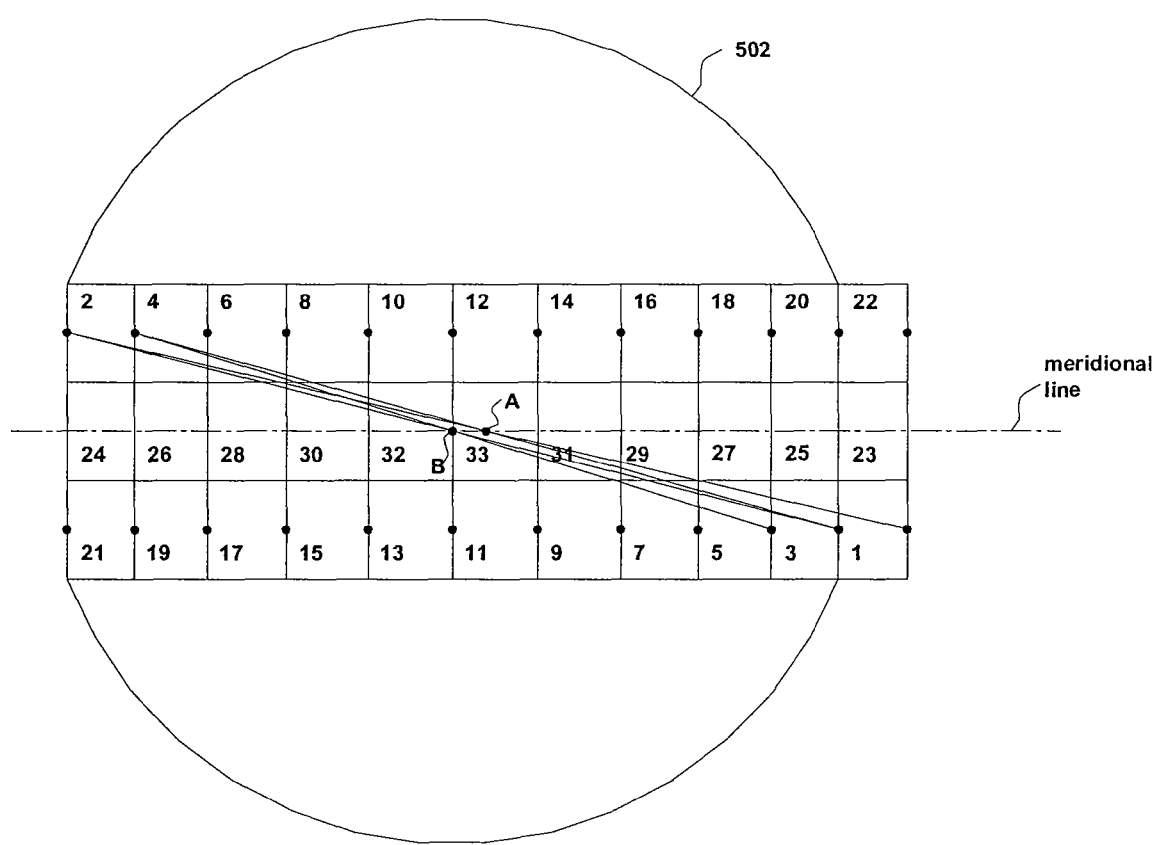
FIG. 9 shows an embodiment of a position of the pump beam on the large spherical mirror of FIG. 5 during multi-reflection.

FIG. 9 shows a configuration where the pump beam is passing through the meridional line. This configuration allows the pump beam to hit each mirror 504 and 506 for 33 times. For simplicity and clarity of drawing, the numbers in FIG. 9 indicate the positions of the beam on mirror 502 instead of beam numbers. The pump beam is incident from position 1, reflected to position 2, reflected to position 3, . . . , and so on. After multiple reflections, a beam reflected by mirror 504 exits from position 22. A beam conversion means can be used to convert the exit beam from position 22 into a beam incident from position 23 in the meridional plane toward point A' on mirror 504. Position 33 is coincident with point A, which is the center of curvature of mirror 504. In an implementation, the beam is reflected by mirror 506 (point B') to position 33 on mirror 502, which is the center of curvature of mirror 504 (point A). The beam will be reflected from position 33 (point A) to mirror 504 (point A'), then the beam is reflected from point A' to position 33 (point A) and back along the original path to position 1.

In this configuration, beams at positions 1, 3, 5, 7, 9, 11, 13, 15, 17, 19, 21, 23, 25, 27, 29, 31, 33, 31, 29, 27, 25, 23, 21, 19, 17, 15, 13, 11, 9, 7, 5, 3, 1 hit A' on mirror 504 for a total of 33 times. Similarly, beams at positions 2, 4, 6, 8, 10, 12, 14, 16, 18, 20, 22, 24, 26, 28, 30, 32, 33, 32, 30, 28, 26, 24, 22, 20, 18, 16, 14, 12, 10, 8, 6, 4, 2 hit B' on mirror 506 for 33 times.

Since each hit produces two passes, 66 passes of the pump light through each active mirror are realized. Furthermore, since both active mirrors are used to generate a laser beam, the configuration shown in FIG. 9 is effectively equivalent to 132 passes of the pump beam through an active mirror.

Figure 10:
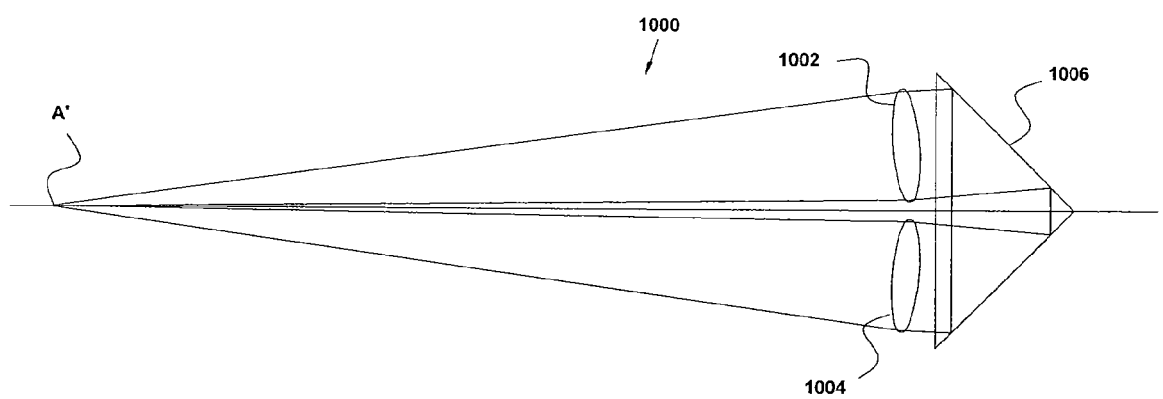
FIG. 10 shows an embodiment of a beam conversion means to convert an exit beam into an incident beam.

Out of many possibilities, FIG. 10 shows a beam conversion means 1000 that can convert the exit beam from position 22 into a beam incident from position 23 in FIG. 9. The beam conversion means 1000 comprises a first lens 1002, a second lens 1004, and a prism 1006. The first lens 1002 collimates the beam at position 22 reflected from A' of mirror 504 (FIG. 9), which is a light cone with tip at A' and base at position 22. After the collimated beam is translated by prism 1006 from positions 22 to 23 and reflected toward A', the second lens 1004 focuses the collimated beam back to A' on mirror 504.

Accordingly, a system using a spherical mirror, two spherical active mirrors, and a beam conversion means (total 4 components) can provide 66 passes of the pump light through each active mirror, which is effectively equivalent to 132 passes of the pump beam through an active mirror. The rest of mirror 502, which is not used for the multi-reflection of pump light, can be trimmed properly to prevent the mirror from blocking a laser beam generated by the pump system.

Figure 11:
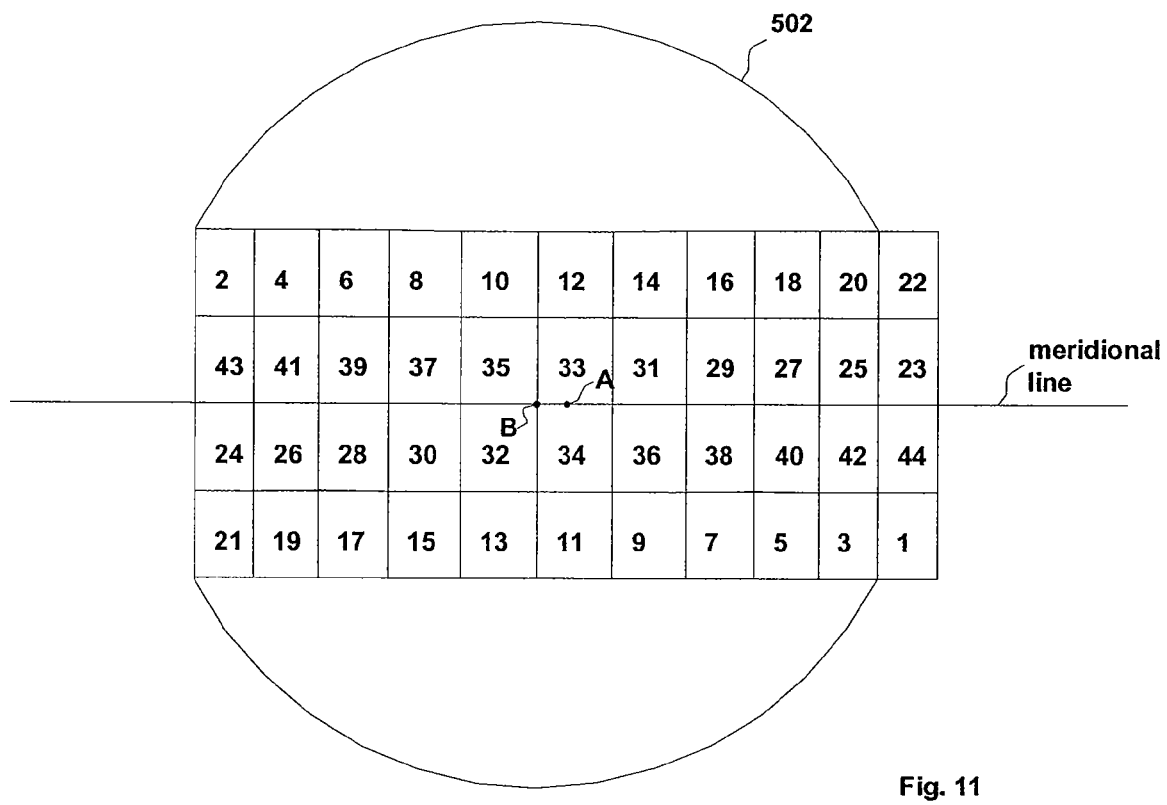

FIG. 11 shows a configuration where the pump beam can be reflected by mirrors 504 for 44 times and 506 for 43 times, provided the beam diameter at mirror 502 is about 10° arc and the mirror 502 is 100° arc. Similar to a configuration of FIG. 9, a beam conversion means is placed in the path between positions 22 and 23. However, position 23 is not in the meridional plane. In this way, a pump light beam at position 1 initially strikes point A' of mirror 504. The light beam is eventually reflected to position 44 after multiple reflections between mirror 502 and mirrors 504 and 506. A small spherical mirror with its center of curvature located at A' of mirror 504 is placed at position 44 to reflect the beam back along its original path to position 1.

Since each hit produces two passes, 88 and 86 passes of the pump light through respective active mirrors are realized. Furthermore, since both active mirrors are used to generate a laser beam, the configuration of FIG. 11 is effectively equivalent to 174 passes of the pump beam through an active mirror.

Accordingly, a system using a spherical mirror, two spherical active mirrors, a beam conversion means, and an extra spherical mirror (total 5 components) can provide 88 and 86 passes of the pump light through respective active mirrors, which is effectively equivalent to 174 passes of the pump beam through an active mirror. The number of reflections can be further increased by adding additional beam conversion means and mirrors. The rest of mirror 502, which is not used for the multi-reflection of pump light, can be trimmed properly to prevent the mirror from blocking a laser beam generated by the pump system.

Referring to FIG. 5, the multi-reflection optical system 500 disclosed above comprises two coupled imaging systems sharing a common mirror 502. The first imaging system includes spherical mirror 502 and spherical active mirror 504, which is optically coupled with the second imaging system including spherical mirror 502 and spherical active mirror 506. It is possible that one of the active mirrors is a simple mirror instead. The first imaging system images point A' to point B', and the second imaging system images back point B' to point A'. In other words, the image of the first imaging system is the object of the second imaging system, and the image of the second imaging system is the object of the first imaging system. The optical axes of two coupled imaging systems are not coincident. The first optical axis OA and the second optical axis OB form an angle, for example 5°. A pump beam entering the multi-reflection optical system 500 is focused and reflected at A' on active mirror 504 and B' on active mirror 506 during the process of multi-reflection.

Multi-Reflection System Using a Lens, a Plane Mirror and a Prism

Figure 12:
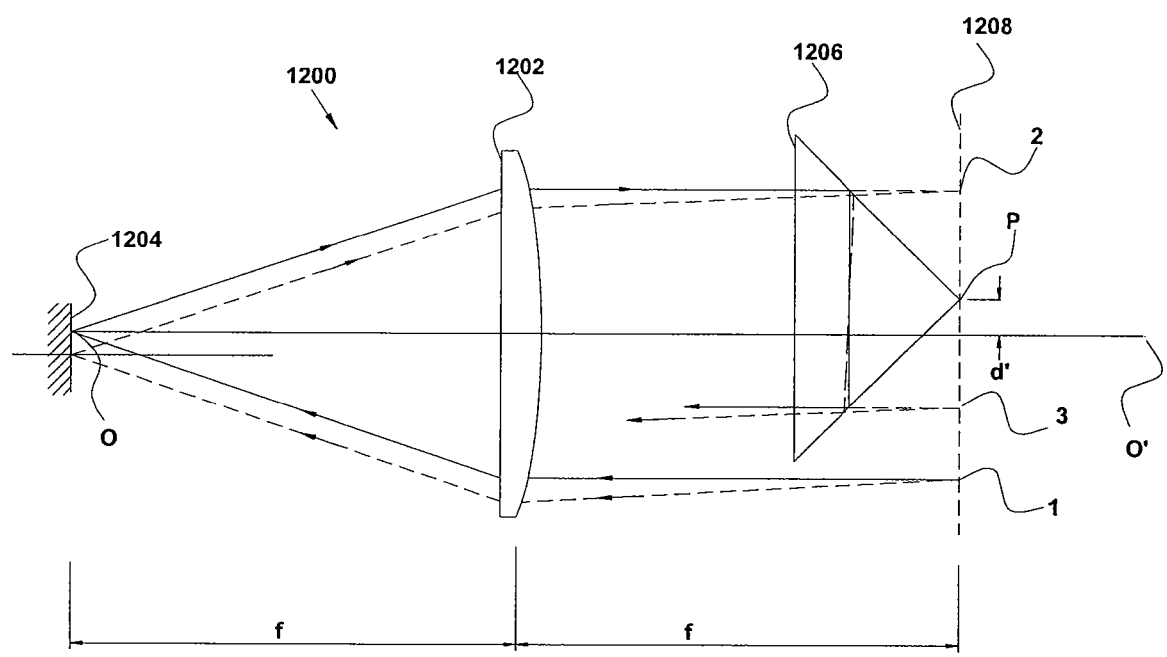
FIG. 12 shows an embodiment of a multi-reflection pump system including a lens, a plane active mirror, and a roof prism.

FIG. 12 shows another embodiment of pump system, 1200, in which a large number of passes of the pump light through the active mirror can be realized. The pump system 1200 comprises a lens 1202, a plane active mirror 1204, and a roof prism 1206. Point O is the focal point of the lens 1202 having a focal length f and an optical axis OO'. A plane active mirror 1204 is disposed in the focal plane of lens 1202 passing through the focal point O and perpendicular to the optical axis OO'. Another focal plane of lens 1202 is a stop plane 1208 of the pump system 1200. The roof edge of roof prism 1206 is at point P on the stop plane 1208. The roof edge of the roof prism 1206 is not on the optical axis OO' and separated by a distance d'.

A diverging pump light beam is transmitted toward lens 1202 from point 1 in the stop plane 1208. Since plane 1208 is a focal plane of lens 1202, the diverging beam transmitted from point 1 will be collimated by lens 1202. The collimated beam strikes the active mirror 1204, and is then reflected by the active mirror. The reflected beam is focused by lens 1202 virtually at a point 2 in the stop plane 1208. Points 1 and 2 are symmetrical with reference to the optical axis OO'. The beam, which is virtually focused at point 2, is reflected by the prism 1206 into a beam virtually emitted from point 3 in the stop plane 1208. Points 2 and 3 are symmetrical with reference to the roof edge P. After a cycle, point 3 will shift by 2d' relative to point 1.

In other words, point 1 is imaged to point 2 by lens 1202 and the active mirror 1204, point 2 is imaged to point 3 by roof prism 1206, point 3 is imaged to point 4 (not shown) by lens 1202 and the active mirror 1204, . . . , and so on. Accordingly, there are two optically coupled imaging systems. The first imaging system includes lens 1202 and the active mirror 1204 with an optical axis OO'. The second imaging system is the roof prism 1206 with roof edge P, where P is not on the optical axes OO'. The roof edge P is separated by a distance d' from the optical axes OO'.

The optical axis OO' is in a meridional plane, which is perpendicular to the plane active mirror 1204, and the roof edge of prism 1206. Thus, the plane of paper of FIG. 12 is the meridional plane. The meridional plane crosses the stop plane 1208 at a meridional line.

Figure 13:
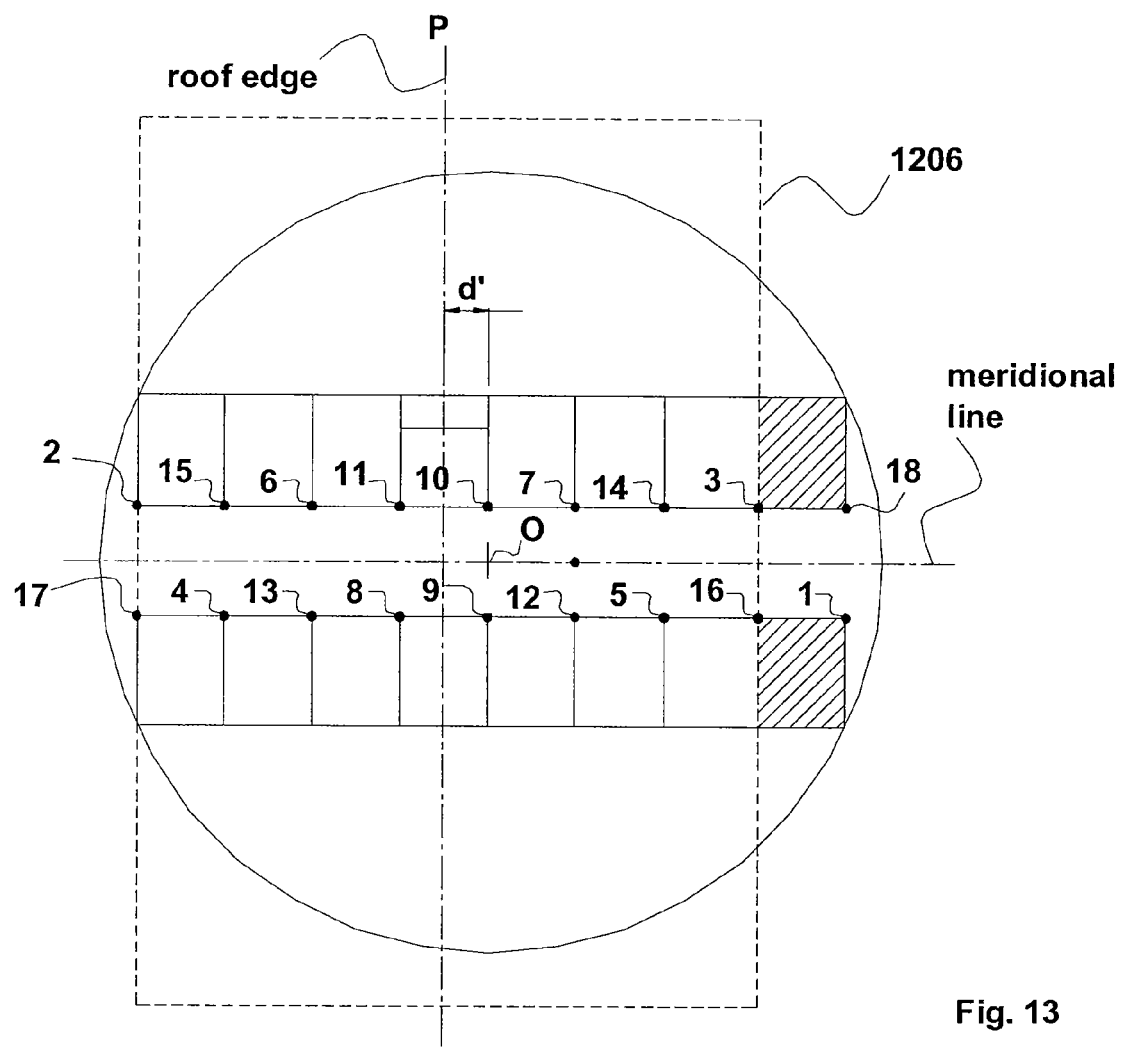
FIG. 13 shows positions of the focused light at the stop plane of FIG. 12 during multi-reflection.

For example, FIG. 13 shows the position of focused light at the stop plane 1208. The incident beam is from point 1, which is not in the meridional plane. The roof edge of prism 1206 is perpendicular to the meridional line. The distance of O from the roof edge is d'. As mentioned earlier, points 2 and 1 are symmetrical with reference to the optical axis OO' or point O in FIG. 13, points 3 and 2 are symmetrical with reference to the roof edge, points 4 and 3 are symmetrical to point O, points 5 and 4 are also symmetrical to the roof edge, . . . , and so on.

Note that FIGS. 7, 9, 11 show the bases of light cones on the spherical mirror 502. In contrast, in FIG. 13, points 1, 2, 3, . . . indicate the tips of light cones on the stop plane 1208. Furthermore, in the pump system of FIG. 12, the active mirror is struck by collimated pump beams. On the other hand, in the pump system of FIG. 5, pump beams are focused on the active mirror.

For example, the incident beam from point 1 will be reflected by mirror 1204 for 9 times and exits from point 18. The circle in FIG. 13 is the clear aperture of the stop 1208. The dotted rectangle is roof prism 1206. The shadowed area 1 with 2d' width is the aperture of the incident beam. If a small plane mirror is placed at point 18 to reflect the beam back along its original path, the beam will return from point 18 to point 1. In this way, the beam hits mirror 1204 for 18 times. It can be seen that this result is similar to an example shown in FIG. 7, however, the order of beam position in the stop plane is different.

For example, for a 120°×120° stop aperture and a 10°×10° incident beam, the beam hits mirror 1204 for 26 times. Since each hit produces two passes, 52 passes of the pump light through respective active mirrors are realized. A 120°×120° stop aperture is corresponding to NA (numerical aperture) of 0.87. Although lens 1202 can be any light focusing means including a simple lens, to achieve such large NA, lens 1202 can be a combination of lenses, an aspheric lens, a HOE (holographic optical element), or a DOE (diffractive optical element). The roof prism 1206 can also be replaced with two planar mirrors positioned perpendicular to each other.

Figure 14A:
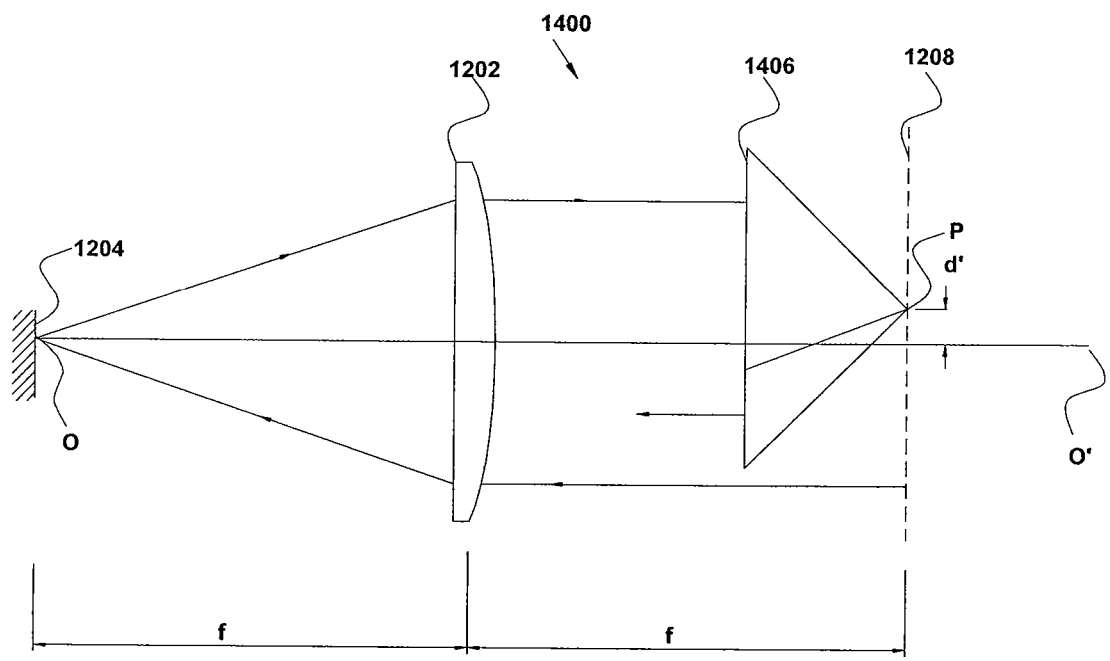
FIG. 14(a) shows an embodiment of a multi-reflection pump system including a lens, a plane active mirror, and a corner cube prism.
Figure 14B:
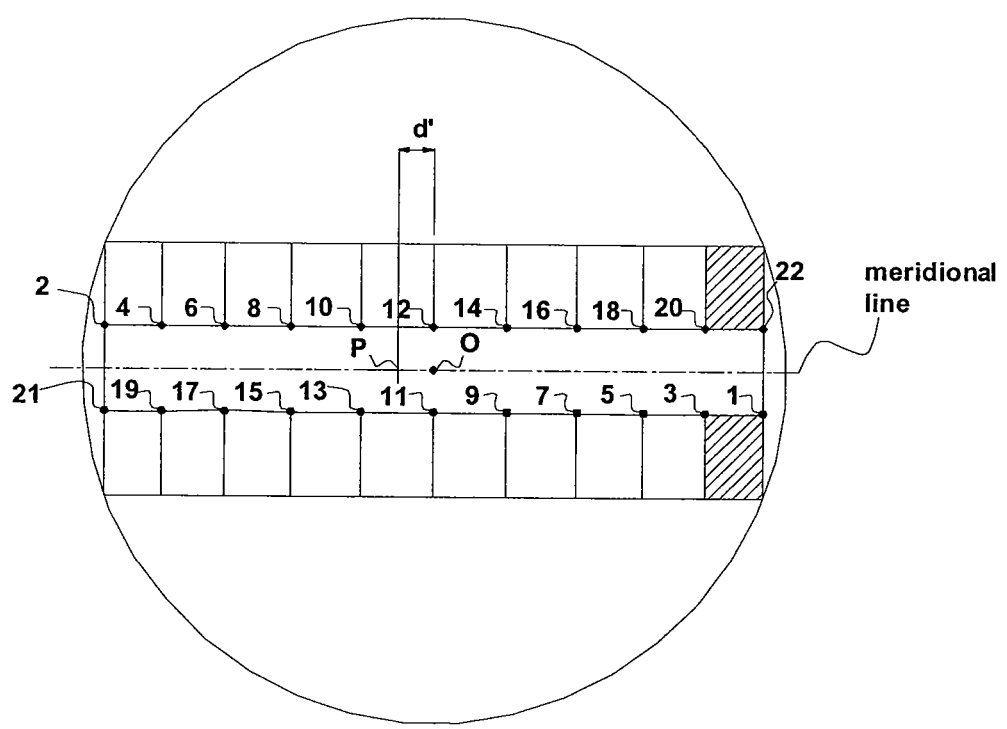
FIG. 14(b) shows positions of the focused light at the stop plane of FIG. 14(a) during multi-reflection.

FIG. 14(*a*) shows a pump system 1400 where roof prism 1206 is replaced by a corner cube prism 1406. The positions of beam in the stop plane are shown in FIG. 14(*b*). Since a roof prism provides a left-to-right mirror image and a corner cube prism provides a left-to-right and up-to-down mirror image, the positions of beam in FIGS. 13 and 14(*b*) are different.

Accordingly, a system using a lens, an active mirror, a roof prism or a corner cube prism, and a plane mirror (total 4 components) can possibly provide 52 passes of the pump light through an active mirror. The number of reflection depends on the NA of the lens.

Referring to FIGS. 12 and 14(*a*), the multi-reflection optical systems 1200 and 1400 disclosed above comprise two coupled imaging systems. The two imaging systems are optically coupled, so that a point 1 is imaged to a point 2 by the first system, point 2 is imaged to a point 3 by the second system, point 3 is imaged to a point 4 by the first system, and so on. The optical axes of two systems are parallel and separated by a distance, so that points 1 and 3 are also separated. Similarly, points 2 and 4 are separated. However the position of the reflected collimated beam at an active mirror is substantially unchanged during the process of multi-reflection.

Other Multi-Reflection System Using Two Coupled Imaging Systems

Figure 15:
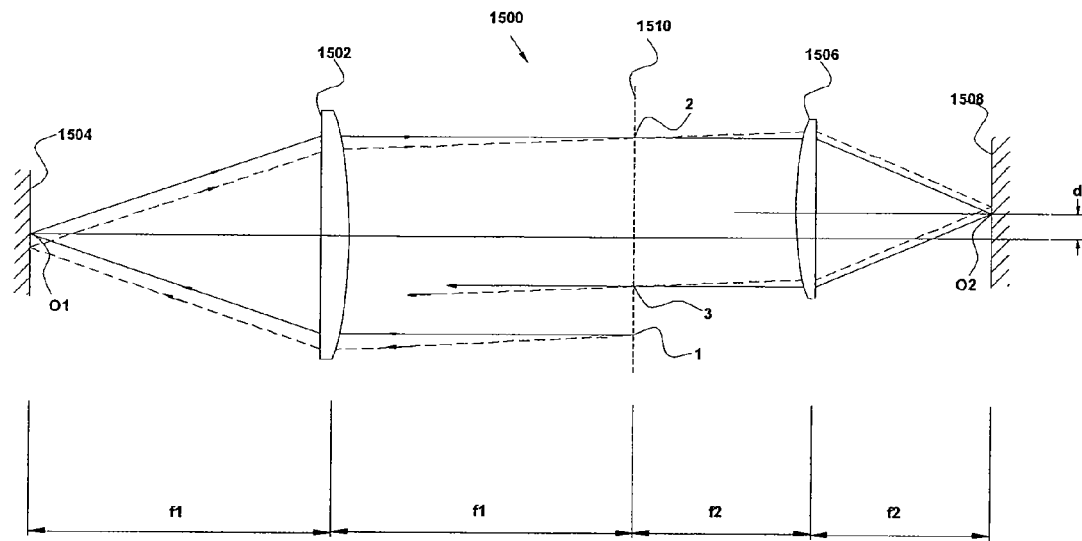
FIG. 15 shows an embodiment of a multi-reflection pump system including two lenses and two plane mirrors.

FIG. 15 shows yet another embodiment of pump system 1500, in which a large number of passes of the pump light through the active mirror can be realized. The roof prism 1206 of FIG. 12 is replaced by a lens and a mirror. The pump system 1500 comprises a first lens 1502, a plane active mirror 1504, a second lens 1506, and a plane mirror 1508. The plane mirror 1508 can also be a plane active mirror. This arrangement shows two optically coupled imaging systems, the first imaging system including the first lens 1502 and the plane active mirror 1504, and the second imaging system including the second lens 1506 and the plane mirror 1508.

The focal lengths of lenses 1502 and 1506 are f1 and f2, respectively. The active mirror 1504 is disposed at the focal point O1 of lens 1502, and mirror 1508 is disposed at the focal point O2 of lens 1506, perpendicular to each optical axis. The optical axes of the first imaging system comprising lens 1502 and the second imaging system comprising lens 1506 are parallel and shifted by a distance d'. The stop plane 1510 is the common focal plane of lenses 1502 and 1506.

A diverging pump light beam is transmitted toward lens 1502 from point 1 in the stop plane 1510. Point 1 is imaged to a point 2 in the stop plane 1510 by the first lens 1502 and the active mirror 1504. Point 2 is then imaged to a point 3 by the second lens 1506 and mirror 1508. Point 3 is further imaged by the first lens 1502 and the active mirror 1504, and so on. Similar to a corner cube prism, the imaging system of lens 1506 and mirror 1508 provides a left-to-right and up-to-down mirror image. Therefore, the positions of beam in the stop plane 1510 are the same as that shown in FIG. 14(*b*), by changing O into O1 and P into O2. In a theoretical view, the pump system 1500 is similar to pump systems 1200 and 1400 in FIGS. 12 and 14(*a*), respectively.

Figure 16:
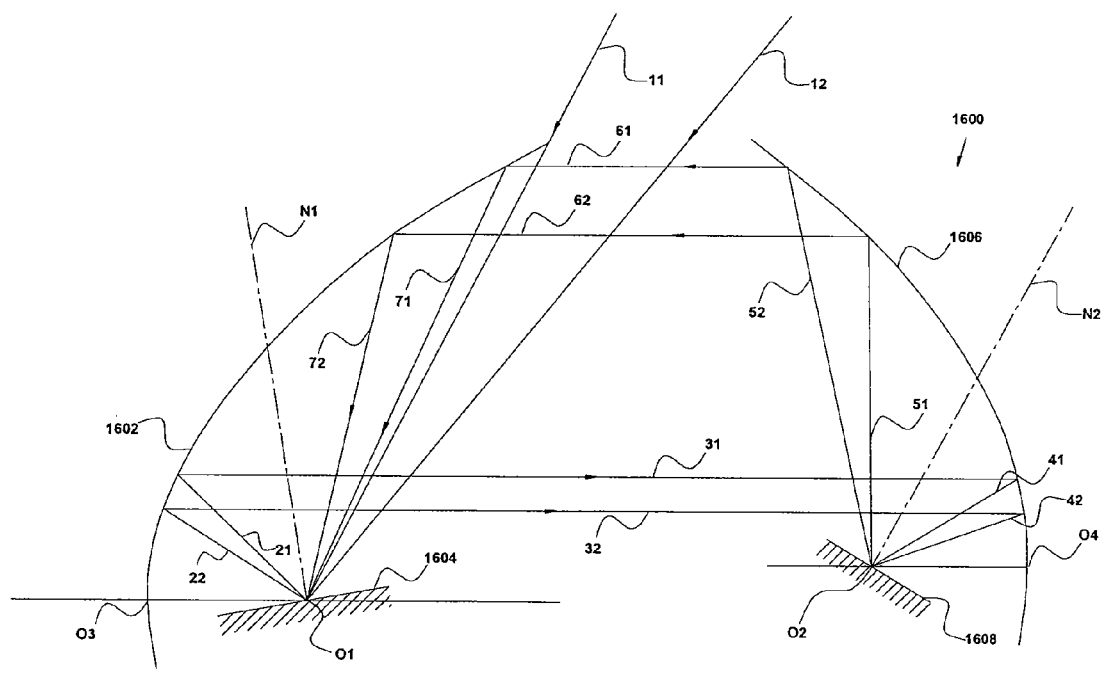
FIG. 16 shows an embodiment of a multi-reflection pump system including two parabolic mirrors and two plane mirrors.

FIG. 16 shows further another embodiment of pump system 1600 in which a large number of passes of the pump light through the active mirror can be realized. The pump system 1600 comprises a first parabolic mirror 1602, a plane active mirror 1604, a second parabolic mirror 1606, and a plane mirror 1608. The plane mirror 1608 can also be a plane active mirror. This arrangement also shows two optically coupled imaging systems, the first imaging system including the first parabolic mirror 1602 and the plane active mirror 1604, and the second imaging system including the second parabolic mirror 1606 and the plane mirror 1608.

Points O3 and O4 are the vertexes of parabolic mirrors 1602 and 1606, respectively. Points O1 and O2 are the focal points of parabolic mirrors 1602 and 1606, respectively. The optical axis of the first imaging system comprising parabolic mirror 1602 is O3O1. The optical axis of the second imaging system comprising parabolic mirror 1606 is O2O4. Two optical axes are parallel and separated by a distance d'.

The focal point O1 is on the plane active mirror 1604, and the focal point O2 is on the plane mirror 1608. The plane active mirror 1604 and mirror 1608 are tilted to allow multi-reflection. An incident pump beam 11-12 is focused by a lens (not shown) at the focal point O1 on the active mirror 1604. The beam is reflected by the active mirror 1604 into a beam 21-22. The beam 21-22 is reflected by parabolic mirror 1602 into a beam 31-32 parallel to its optical axis. The beam 31-32 is focused by parabolic mirror 1606 at O2 on mirror 1608 as a beam 41-42. The beam 41-42 is further reflected by mirror 1608 into a beam 51-52, which is reflected by parabolic mirror 1606 into a beam 61-62 parallel to its optical axis, and then focused at O1 by parabolic mirror 1602 as a beam 71-72, completing a cycle.

Figure 17:
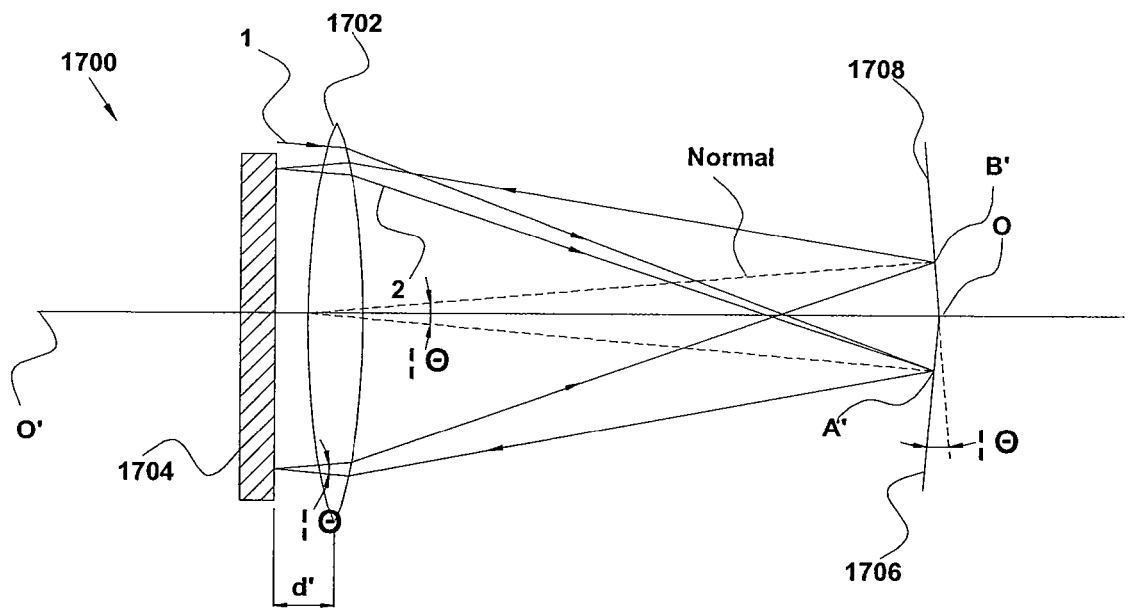
FIG. 17 shows an embodiment of a multi-reflection pump system including a lens, two plane mirrors, and a plane active mirror.

FIG. 17 shows yet further another embodiment of pump system 1700 in which a large number of passes of the pump light through the active mirror can be realized. The pump system 1700 comprises a lens 1702, a plane mirror 1704, a tilted plane active mirror 1706 and a plane mirror 1708. The plane mirror 1708 can also be an active mirror. Lens 1702 can be a combination of lenses, an aspheric lens, a HOE (holographic optical element), or a DOE (diffractive optical element). This arrangement shows two optically coupled imaging systems. The first imaging system includes the tilted active mirror 1706, lens 1702 and mirror 1704, the second imaging system includes mirror 1708, lens 1702 and mirror 1704.

The active mirror 1706 and mirror 1708 are disposed in the focal plane of lens 1702. Mirror 1704 is normal to the optical axis OO' of lens 1702, and disposed with a small distance d' to lens 1702. The normal of the active mirror 1706 is tilted to the optical axis OO' of lens 1702 by a small angle $\theta/2$. Mirror 1708 is tilted relative to the active mirror 1706 by a small angle $\theta$. Accordingly, the axes of two imaging systems form an angle $\theta$. The active mirror 1706 and mirror 1708 are symmetrical with reference to OO'.

A collimated pump beam is incident from position 1. The collimated beam is focused at A' on the active mirror 1706. Point A' is imaged by the first imaging system including the active mirror 1706, lens 1702, and mirror 1704 at a point B' on mirror 1708. Point B' is then imaged by the second imaging system including mirror 1708, lens 1702, and mirror 1704 back to A'. After one cycle, the beam position translates a distance of about $2d'\theta$ to position 2 on mirror 1704. The imaging process is repeated until the pump beam is out of the mirror 1704. In a theoretical view, the pump system 1700 is similar to pump system 500 in FIG. 5.

Therefore, it is understood that a large number of passes of the pump light through the active mirror can be realized using a pair of coupled imaging systems, where the optical axes of imaging systems are not coincident. In some implementations, two imaging systems are optically coupled, so that a point A' is imaged at a point B' by the first imaging system, point B' is imaged back at point A' by the second imaging system. The optical axes of two imaging systems are not coincident, so that the reflected beam changes its direction for each reflection although the image point A' and B' are not substantially changed. At least one of the two points A' and B' is in an active mirror.

In some implementations, two imaging systems are optically coupled, so that a point 1 is imaged to a point 2 by the first system, point 2 is imaged to a point 3 by the second system, point 3 is imaged to a point 4 by the first system, and so on. The optical axes of two systems are not coincident, so that points 1 and 3 are not coincident. Similarly, points 2 and 4 are not coincident. However the position of the reflected collimated beam on an active mirror is substantially unchanged.

Laser Amplifier and Q-switch Lasers

In addition to providing a laser, the pump systems disclosed above can be used to provide a laser amplifier, where the amplified laser beam travels multiple times to extract energy from the laser crystal disk. Not only can a multi-reflection system be used for pump light, it can also be used as a laser amplifier. The pump and amplified beams can use a single multi-reflection system or separate multi-reflection systems.

Unlike a pump beam, an amplified laser beam has a very small divergence angle, e.g., almost collimated. In order to fully extract the energy stored in the active mirrors, the spot size of the amplified beam on an active mirror is made substantially the same as the spot size of the pump beam on the same active mirror.

Figure 18:
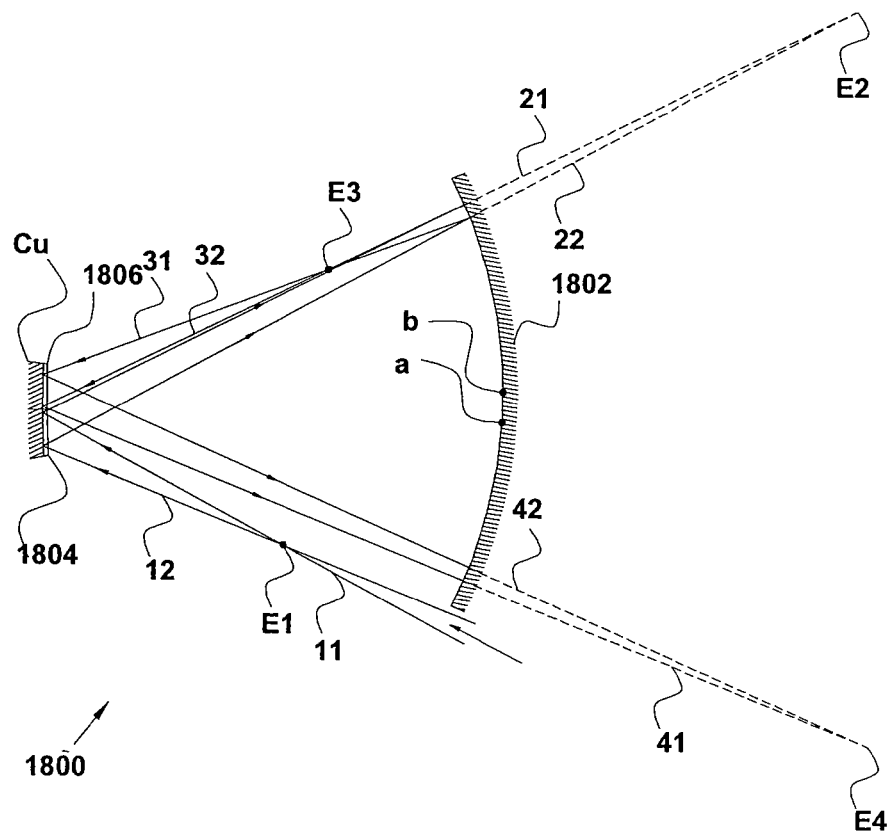
FIG. 18 shows an embodiment of a laser amplifier using the pump system of FIG. 5.

For example, FIG. 18 shows a laser amplifier 1800 based on an arrangement shown in FIG. 5 comprising a spherical mirror 1802 and two spherical active mirrors 1804 and 1806. An incoming laser beam 11-12 is first focused at point E1. After being focused at point E1, beam 11-12 strikes the active mirror 1804, which reflects beam 11-12 into a beam 21-22. Beam 21-22 is virtually focused at point E2. Beam 21-22 is reflected by mirror 1802 into a beam 31-32 and focused at point E3. Beam 31-32 is further reflected by active mirror 1806 into a beam 41-42, and virtually focused at point E4. The process is repeated until the beam is out of mirror 1802. The number of reflections can be further increased using additional beam conversion means and reflectors as discussed previously.

Therefore, it is possible that a laser beam strikes an active mirror over hundred times in a multi-reflection system. This laser amplifier can replace regenerative amplifiers that have complicated structures.

In addition to a laser amplifier mentioned above, a multi-reflection system including active mirrors can also be used as an oscillator. For example, a pair of cavity mirrors, e.g., a high-reflection mirror and a partial-reflection mirror, are disposed at the beam input and output positions (see FIG. 6). Since the gain in the cavity is sufficiently high, a switch or SESAM (semiconductor saturable absorber mirror) can be inserted in the oscillator to form a novel active mirror Q-switch laser or mode-locked laser.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. An optical system comprising:
a relatively larger concave spherical mirror,
a first relatively smaller concave spherical mirror and a second relatively smaller concave spherical mirror, at least one of said first and second relatively smaller concave spherical mirrors being an active mirror, a center of curvature of said relatively larger concave spherical mirror being at a central point between said first and second relatively smaller concave spherical mirrors, the centers of curvature of said first and second relatively smaller concave spherical mirrors being at said relatively larger concave spherical mirror, and
a source generating a pump light beam which enters and leaves said system after multiple reflections between said relatively larger mirror and said first and second relatively smaller mirrors, said beam being focused and reflected at substantially unchanged positions at said first and second relatively smaller concave spherical mirrors, said beam striking and being reflected by said relatively larger concave spherical mirror at changing positions.

2. An optical system according to claim 1 further comprising a high-reflection mirror and a partially reflecting mirror, said high-reflection and partially reflecting mirrors together with said first and second small concave spherical mirrors forming a laser cavity.

3. An optical system according to claim 2 wherein said large concave spherical mirror defines a hole at its central region allowing a laser beam to pass through said large concave spherical mirror.

4. An optical system according to claim 1 wherein said active mirror comprises a crystal disk and a high-reflection layer on a back of said disk, said disk being mounted on a heat sink.

5. An optical system according to claim 4 wherein said active mirror further comprises a cap covering a front surface of said crystal disk, said cap including an anti-reflection coating.

6. An optical system according to claim 5 wherein said cap is in contact with the heat sink.

7. An optical system according to claim 1 further comprising a laser beam entering said optical system which is focused at a point in a space between said relatively larger spherical mirror and said first relatively smaller spherical mirror, and leaving said optical system after multiple reflections between said relatively larger mirror and said first and second relatively smaller mirrors.

8. An optical system according to claim 7 further comprising a high-reflection mirror and a partially reflecting mirror.

9. An optical system according to claim 8 further comprising a switch for Q-switching.

10. An optical system according to claim 8 further comprising a SESAM (semiconductor saturable absorber mirror) for mode locking.

* * * * *